(12) United States Patent
Poster (10) Patent No.: US 10,655,726 B2
(45) Date of Patent: May 19, 2020

(54) LUBRICATION SYSTEM WITH PASSIVE VALVE

(71) Applicant: Bell Helicopter Textron Inc., Fort Worth, TX (US)

(72) Inventor: Scott Poster, Arlington, TX (US)

(73) Assignee: Textron Innovations Inc., Providence, RI (US)

(*) Notice: Subject to any disclaimer, the term of this patent is extended or adjusted under 35 U.S.C. 154(b) by 389 days.

(21) Appl. No.: 15/729,112

(22) Filed: Oct. 10, 2017

(65) Prior Publication Data

US 2018/0038474 A1 Feb. 8, 2018

Related U.S. Application Data

(60) Division of application No. 14/962,631, filed on Dec. 8, 2015, now Pat. No. 9,816,601, which is a continuation-in-part of application No. 13/794,063, filed on Mar. 11, 2013, now Pat. No. 9,206,944.

(51) Int. Cl.
*F16H 57/04* (2010.01)
*F16K 31/122* (2006.01)
*B64C 27/12* (2006.01)
*F16N 7/00* (2006.01)

(52) U.S. Cl.
CPC .......... *F16H 57/0413* (2013.01); *B64C 27/12* (2013.01); *F16H 57/045* (2013.01); *F16H 57/0447* (2013.01); *F16K 31/1221* (2013.01); *F16N 7/00* (2013.01)

(58) Field of Classification Search
CPC .... F16H 57/04; F16H 57/045; F16H 57/0447; F16H 57/043; F16K 31/122; B64C 27/12; F16N 7/00; F16N 13/22; G04R 40/02
USPC ........................................................ 184/6.22
See application file for complete search history.

(56) References Cited

U.S. PATENT DOCUMENTS

| 4,114,571 | A | * | 9/1978 | Ruf | ........................... F01M 1/08 123/196 AB |
| 6,065,682 | A | * | 5/2000 | Frunzetti | ................... F01P 7/16 236/12.15 |
| 6,772,958 | B1 | * | 8/2004 | Lamb | ....................... F01P 7/16 236/100 |
| 9,816,601 | B2 | * | 11/2017 | Poster | ................. F16H 57/0413 |
| 2007/0261922 | A1 | * | 11/2007 | Mullen | ................... B64C 27/14 184/6.12 |
| 2009/0014248 | A1 | * | 1/2009 | Yamashita | ......... F01M 11/0004 184/6.24 |
| 2011/0210179 | A1 | * | 9/2011 | Moser | ................. F16H 57/0447 236/93 R |
| 2015/0211395 | A1 | * | 7/2015 | Gooden | .............. F16H 57/0417 165/280 |

* cited by examiner

*Primary Examiner* — Robert T Reese
(74) *Attorney, Agent, or Firm* — Lightfoot & Alford PLLC (57) ABSTRACT

A valve with supplemental media and a piston configured to open the valve when a first force is greater than a second force. The pressure of the supplemental media exerts a substantial portion of the first force. The valve also has a biasing member that changes volume as temperature changes and exerts a substantial portion of the second force. The second force decreases as the temperature of the biasing member increases.

11 Claims, 9 Drawing Sheets

LUBRICATION SYSTEM WITH PASSIVE VALVE

BACKGROUND

Technical Field

The present disclosure generally relates to a lubrication system, and more particularly, to a lubrication system having a passive valve for allowing supplemental lubrication to be deployed onto a mechanical assembly.

Description of Related Art

Conventional supplemental lubrication systems for a mechanical assembly are either continuously fed and use gravity to deploy lubricant onto a mechanical assembly, or pressurized and use an electronic valve to deploy lubricant onto a mechanical assembly. However, these conventional supplemental lubrication systems either deploy their contents prior to when it is most needed or requires input from an operator, crew member, or system logic to be activated.

Hence, there is a need for an improved lubrication system.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the present disclosure generally provide a lubrication system for lubricating and cooling a mechanical assembly. As described herein, the lubrication system may comprise one or more passive drain valves for draining a portion of the lubricating media 120 in the event of pump failure, thereby preventing hazardous immersion of the mechanical assembly. In an embodiment of the lubrication system, one or more passive drain valves may be located above a dynamic operating level, and below a static non-operating level, of the lubricating media 120. In an embodiment, a drain valve will fail open, thereby preventing hazardous immersion of the mechanical assembly in the event of drain valve failure. In another embodiment, a drain valve may comprise thermally activated media operable to open the drain valve, and the drain valve may be constructed to prevent the media from entering the lubrication system upon actuation.

FIGS. 1-8B illustrate representative configurations of lubrication system 200 and parts thereof. It should be understood that the components of lubrication system 200 and parts thereof shown in FIGS. 1-8B are for illustrative purposes only, and that any other suitable components or subcomponents may be used in conjunction with or in lieu of the components comprising lubrication system 200 and parts thereof described herein.

A lubrication system 200 according to the present disclosure may be used in the operation of a variety of mechanical assemblies 100 including, but not limited to, power generation or transfer devices, such as gearboxes, transmissions, and engines. Friction between moving components in these mechanical assemblies 100, such as friction created by high-speed spinning gears 110, generates heat that may damage components therein. Some lubrication systems employ a cycle in which a lubricating media 120, such as oil, is first distributed onto components susceptible to friction, then gathers in a collection area where it is then pumped back to a location where it may be redistributed back onto the components. If the pumping mechanism fails, hot lubricating media 120 may accumulate in the collection area and possibly submerge components proximate thereto, causing damage and potential failure of the mechanical assembly 100. It is desirable to drain this hot lubricating media 120 from the collection area prior to it reaching a hazardous level. Some lubrication systems employ an electromechanically actuated valve that may drain the hot lubricating media 120 from the collection area in the event of pump failure. In such systems, a sensor may be used to detect pump failure and trigger the valve to open. In operation, electromechanically actuated valves may require time to run a BIT check upon startup and may be susceptible to failure, resulting in frequent maintenance, replacement, and system downtime. Electromechanically actuated valves may also be heavy, resulting in reduced performance if used in vehicle applications such as fixed-wing and rotary-wing aircraft.

The present disclosure is directed to a lubrication system 200 for lubricating and cooling a mechanical assembly 100. Embodiments of lubrication system 200 may provide for passively detecting and abating an accumulation of, and hazardous temperature increase in, lubricating media 120 within the lubrication system 200. Embodiments may also provide for simple, lightweight, low maintenance, and substantially failsafe systems for draining hazardous lubricating media 120 before reaching levels that may damage components of the mechanical assembly 100.

Figure 1:
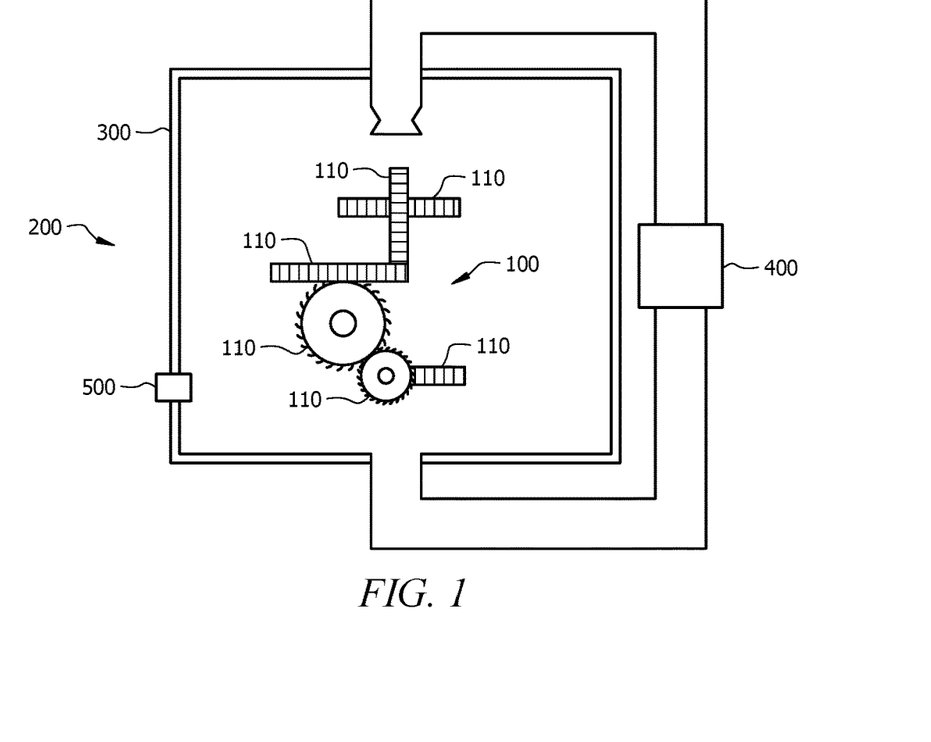
FIG. 1 depicts a side cutaway view of a lubrication system according to an embodiment of the present disclosure.

FIG. 1 depicts a representative lubrication system 200 for a mechanical assembly 100, the lubrication system 200 comprising a collection area 300, a pumping system 400, and one or more passive drain valves 500, as described in more detail herein.

Figure 2:
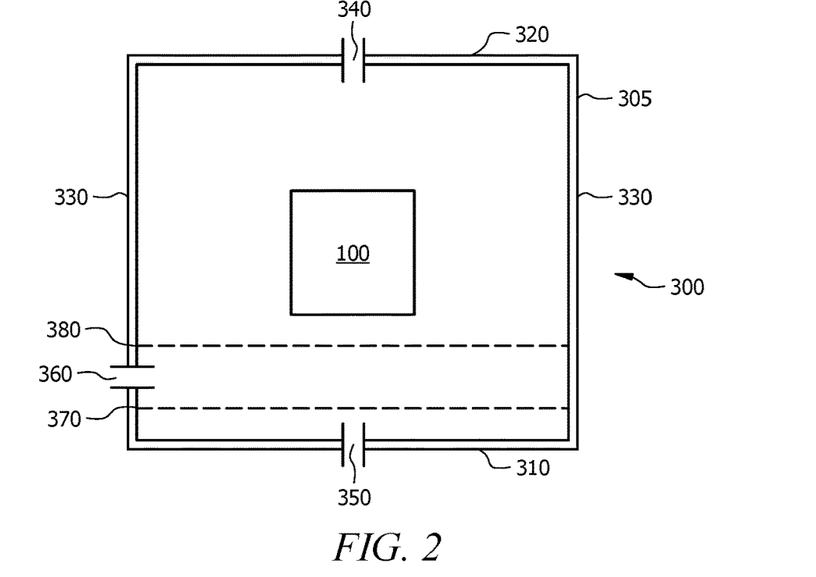
FIG. 2 depicts a side cutaway view of a collection area of the lubrication system according to an embodiment of the present disclosure.

FIG. 2 depicts an isolated side cutaway view of the collection area 300 of lubrication system 200. Collection area 300 may comprise a housing 305 having a bottom 310, a top 320, and sides 330, and housing 305 may be any suitable size, shape, material, and construction capable of containing a mechanical assembly 100 and collecting any lubricating media 120 distributed to and/or shed therefrom. Collection area 300 may further comprise one or more inlet ports 340, one or more outlet ports 350, and one or more drain valve ports 360. Inlet port 340 may be positioned in any location along the surface of housing 305 of collection area 300 from which lubricating media 120 may be sufficiently distributed to a mechanical assembly 100 disposed therein. In an embodiment, inlet port 340 is located along the top 320 of housing 305 of collection area 300 such that gravity may assist in distributing any lubricating media 120 entering therefrom to the components of the mechanical assembly 100. Outlet port 350 may be positioned in any location along the surface of housing 305 of collection area 300 from which lubricating media 120 may be sufficiently withdrawn from the collection area 300. In an embodiment, outlet port 350 is located along the bottom 310 of housing 305 of collection area 300 such that gravity may cause lubricating media 120 to collect proximate to outlet port 350. Drain valve port 360 may be positioned along a side surface 330 of housing 305 of collection area 300, and located above a predetermined dynamic operating level 370 and below a predetermined static level 380, as described in more detail herein.

Figure 3:
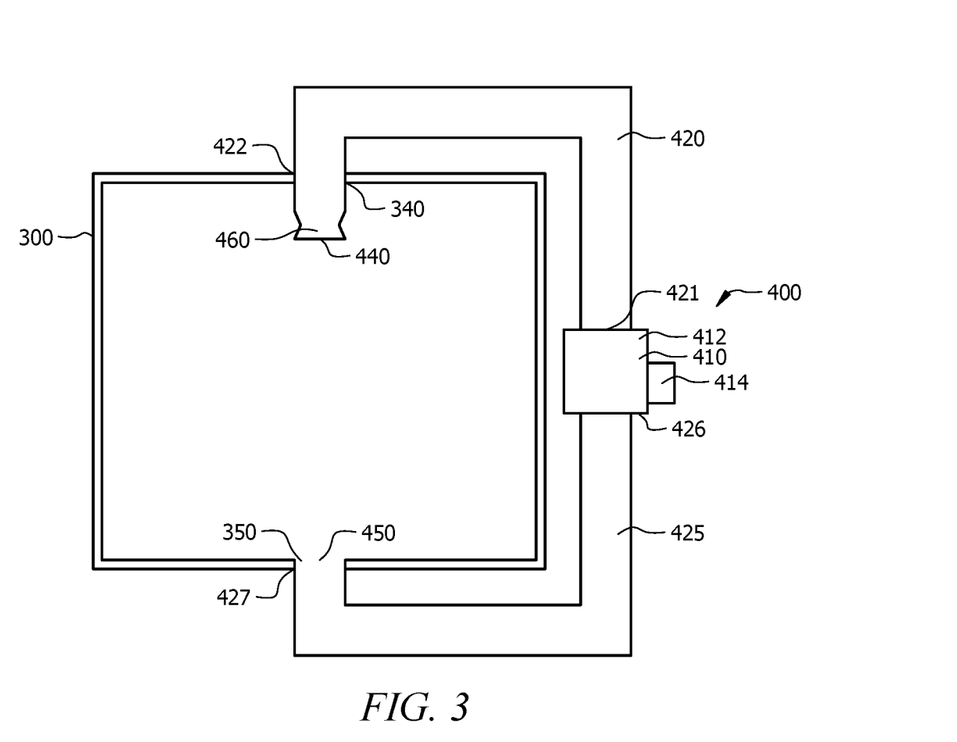
FIG. 3 depicts a side cutaway view of a pumping system coupled to a collection area of a lubrication system according to an embodiment of the present disclosure.

Referring now to FIG. 3, lubrication system 200 may further comprise a pumping system 400 coupled to collection area 300. Pumping system 400 may comprise a pumping mechanism 410 coupled to upper and lower conduits 420, 425 comprising a suction line 425 and a discharge line 420. Pumping mechanism 410 may comprise any suitable mechanism capable of transporting lubricating media 120 from a withdrawal location 450 through conduits 425 and 420 to a distribution location 440. Conduits 425 and 420 may establish fluid communication between pumping mechanism 410 and withdrawal/distribution locations 450/440, respectively. Pumping system 400 may further comprise one or more distribution mechanisms 460 coupled to distribution location(s) 440. A distribution mechanism 460 may comprise any suitable device known in the art that may direct or manipulate the flow of lubricating media 120 passing therethrough, such as a spray nozzle. In an embodiment, pumping mechanism 410 comprises a pump 412 mechanically or electrically driven by a gearbox or an electric motor 414, respectively. The pump 412 may be fixedly coupled to the proximate ends 421, 426 of the conduits 420, 425, respectively, with distal end 427 of conduit 425 fixedly coupled to a withdrawal location 450, and with distal end 422 of conduit 420 fixedly coupled to a distribution mechanism 460 positioned at distribution location 440. Withdrawal location 450 and distribution location 440 may coincide with and couple to inlet port 340 and outlet port 350 of collection area 300, respectively.

Figure 4A:
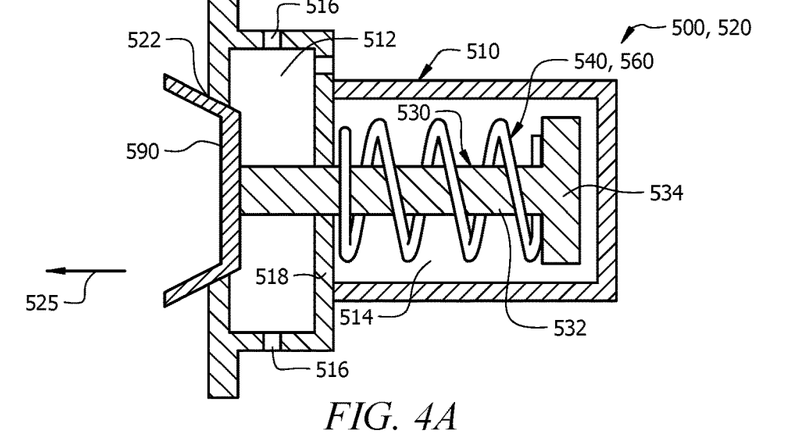
FIGS. 4A to 4C depict side cutaway views of representative passive drain valves, respectively, for use in a lubrication system according to various embodiments of the present disclosure.
Figure 4B:
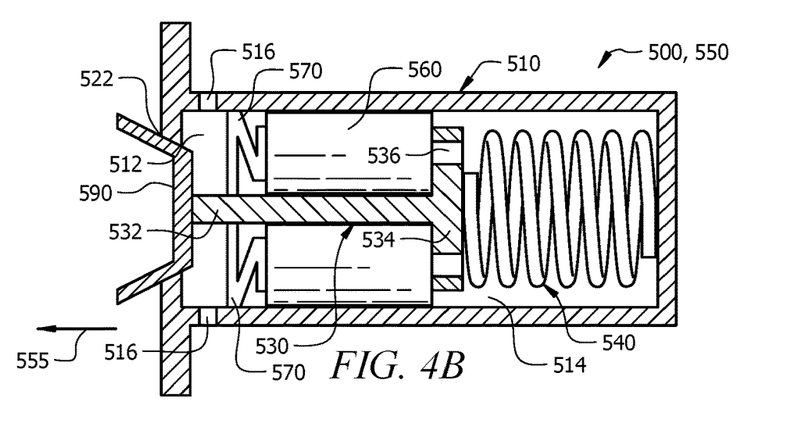
Figure 4C:
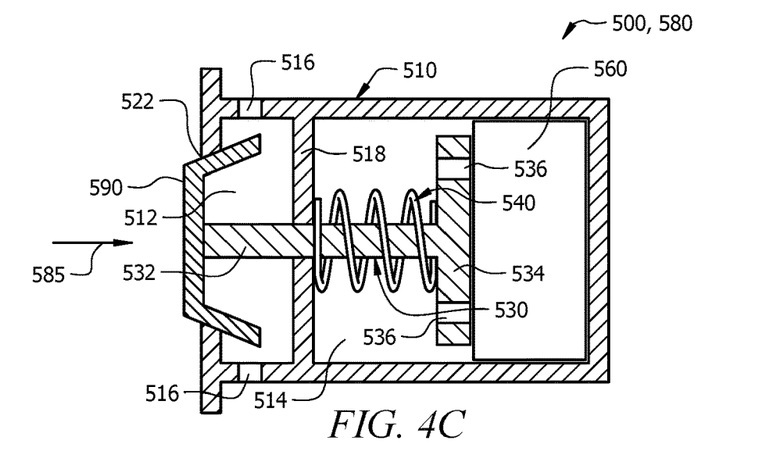

Referring now to FIG. 4A to 4C, lubrication system 200 may further comprise one or more passive drain valves 500, such as valve 520 shown in FIG. 4A, valve 550 shown in FIG. 4B, and valve 580 shown in FIG. 4C, with like reference numerals representing like components. In operation, the one or more passive drain valves 500 may drain a portion of the lubricating media 120 from the collection area 300 in the event that the lubricating media 120 raises to a predetermined level and predetermined threshold temperature in the collection area 300, as may happen in the event of pump mechanism 410 failure.

Each of passive drain valves 520, 550, and 580 comprises: a two-chamber casing 510 having an outer chamber 512 with ports 516 leading thereto and an inner chamber 514, a piston 530 having a piston shaft 532 and a plunger 534, a spring 540, and a valve plug 590 coupled to the piston shaft 532. Valve 550 shown in FIG. 4B further comprises two sections of material 560 biased against the plunger 534 by Belleville washers 570, and valve 580 shown in FIG. 4C likewise comprises a section of material 560 positioned between the plunger 534 and the end of inner chamber 514. The inner chamber 514 of each valve 520, 550, 580 provides a physical barrier to prevent the plunger 534, the spring 540, and/or the material 560 from exiting into the outer chamber 512 or escaping outside of the casing 510.

Referring again to FIG. 4A, the passive drain valve 520 is shown in the closed position. In the closed position, the force of spring 540 acts against a wall 518 separating chambers 512, 514 of the casing 510 on one end, and the force of spring 540 acts against the plunger 534 on the other end, thereby biasing the piston 530 to the end of inner chamber 514 and retracting the valve plug 590 to seal against a valve seat opening 522 in the casing 510 that leads to outer chamber 512. In an embodiment, spring 540 comprises a material 560 that changes properties with temperature. In an embodiment, spring 540 comprises a bi-metallic material that changes volume with temperature, thereby altering the spring rate of spring 540.

Valve 520 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 520 will also rise, including spring 540. As the temperature of spring 540 rises, the material 560 comprising the spring 540 will respond by changing volume, thereby altering the spring rate of spring 540. As the spring rate is altered, the lubricating media 120 acting on valve plug 590 may overcome the bias force of spring 540, which in turn may cause the valve plug 590 and piston 530 to move in the direction of the arrow 525 shown in FIG. 4A. When the valve plug 590 moves in the direction of arrow 525, it will unseal from the valve seat opening 522 and allow a portion of the lubricating media 120 in outer chamber 512 to drain out. Thus, in this manner, valve 520 is designed to actuate open in the event of pump mechanism 410 failure.

Referring now to FIG. 4B, the passive drain valve 550 is shown in the closed position. In the closed position, the Belleville washers 570 exert a force that acts against sections of material 560 engaging one side of plunger 534, whereas the spring 540 exerts a force that acts against the opposing side of plunger 534, thereby biasing the piston 530 to a position within inner chamber 514 where the valve plug 590 is retracted to seal against the valve seat opening 522 in the casing 510 that leads to outer chamber 512. In an embodiment, material 560 changes properties with temperature. In an embodiment, material 560 changes phase, such as from solid to liquid, at a predetermined threshold temperature. In an embodiment, material 560 comprises a eutectic material. In an embodiment, material 560 comprises lead or tin.

Valve 550 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 550 will also rise, including sections of material 560. As the temperature of sections of material 560 crosses the predetermined threshold temperature, the material 560 will respond by changing phase from solid to liquid. As the material 560 is transformed into a liquid, the liquid material 560 will flow through openings 536 in the plunger 534 and there will be nothing solid for the Belleville washers 570 to act against. As such, the bias force of spring 540 acting against plunger 534 may cause the valve plug 590 and piston 530 to move in the direction of the arrow 555 shown in FIG. 4B. When the valve plug 590 moves in the direction of arrow 555, it will unseal from the valve seat opening 522 and allow a portion of the lubricating media 120 in outer chamber 512 to drain out. Thus, in this manner, valve 550 is designed to actuate open in the event of pump mechanism 410 failure.

Referring now to FIG. 4C, the passive drain valve 580 is shown in the closed position. In the closed position, the spring 540 exerts a force that acts against the wall 518 separating the chambers 512, 514 of casing 510 on one end, and the spring 540 exerts a force that acts against the plunger 534 on the other end. The force of spring 540 biases the piston 530 to a position within inner chamber 514 where the valve plug 590 is retracted to seal against the valve seat opening 522 in the casing 510 that leads to outer chamber 512, and the plunger 534 engages a section of material 560 positioned between the plunger 534 and the end of inner chamber 514. In an embodiment, material 560 changes properties with temperature. In an embodiment, material 560 changes phase, such as from solid to liquid, at a predetermined threshold temperature. In an embodiment, material 560 comprises a eutectic material. In an embodiment, material 560 comprises lead or tin.

Valve 580 may be operatively coupled to the collection area 300 such that, under certain operational conditions, lubricating media 120 from the collection area 300 may rise to a level where it flows through ports 516 into outer chamber 512. As the temperature of the lubricating media 120 increases, as may happen in the event of a pump mechanism 410 failure, for example, the temperature of the components of valve 580 will also rise, including sections of material 560. As the temperature of section of material 560 crosses the predetermined threshold temperature, the material 560 will respond by changing phase from solid to liquid. As the material 560 is transformed into a liquid, the liquid material 560 will flow through openings 536 in the plunger 534 and there will be nothing solid for the spring-loaded plunger 534 to act against. As such, the bias force of spring 540 acting against plunger 534 may cause the valve plug 590 and piston 530 to move in the direction of the arrow 585 shown in FIG. 4C. When the valve plug 590 moves in the direction of arrow 585, it will unseal from the valve seat opening 522 and allow a portion of the lubricating media 120 in outer chamber 512 to drain out. Thus, in this manner, valve 580 is designed to actuate open in the event of pump mechanism 410 failure.

FIGS. 5A-8B illustrate representative levels and flows of lubricating media 120 in an embodiment of lubrication system 200 under various conditions. In particular, the figures represent combinations of conditions wherein mechanical assembly 100 and lubrication system 200 are in various operational states (ON/OFF), and wherein pump system 400 and drain valve 500 are in various modes (OK/FAIL).

Figure 5A:
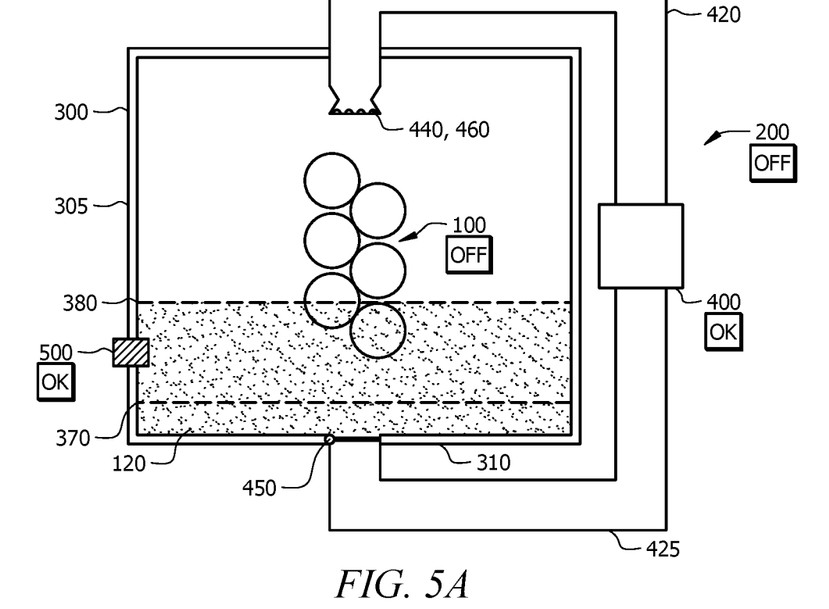
FIG. 5A depicts a side cutaway view of a lubrication system in the OFF state in which both the pumping system and the drain valve are OK according to an embodiment of the present disclosure.
Figure 5B:
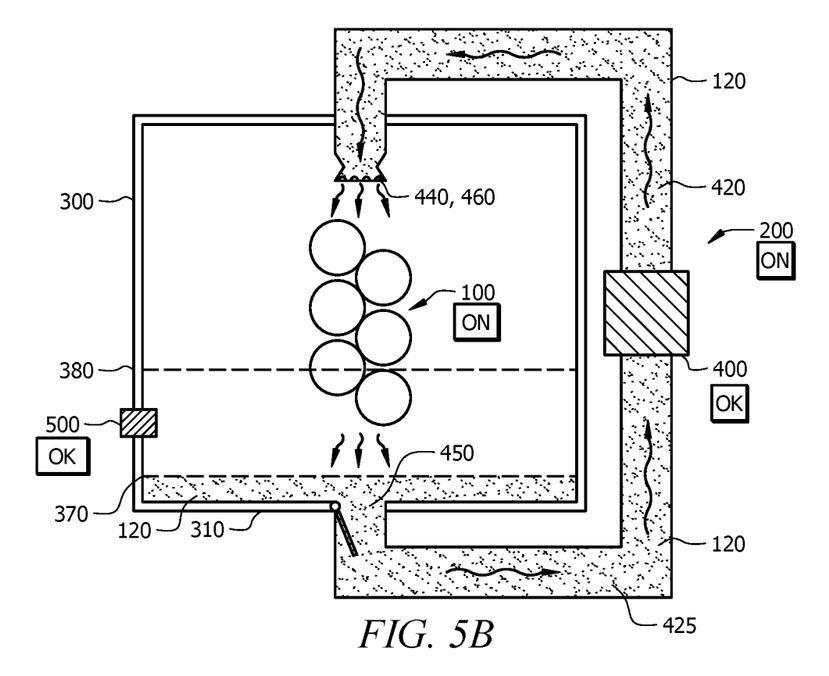
FIG. 5B depicts a side cutaway view of a lubrication system in the ON state in which both the pumping system and the drain valve are OK according to an embodiment of the present disclosure.

FIGS. 5A and 5B illustrate conditions in which both the pumping system 400 and the drain valve 500 are OK. Referring to FIG. 5A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. In this OFF state, the lubricating media 120 accumulates to a static level 380 within the collection area 300. In an embodiment, the static level 380 may be higher than the lowest portions of a mechanical assembly 100 disposed within the lubrication system 200, resulting in the lower portions possibly being submerged in the OFF state. Yet, because the mechanical assembly 100 is OFF, its moving parts are not generating frictional heat, nor are they operating whilst submerged in high-temperature lubricating media 120. In another embodiment, a separate sump for storing the lubricating media 120 may be coupled between the collection area 300 and the pumping system 400, such that a portion or substantially all of the lubricating media 120 may be stored in the separate sump when the lubrication system 200 is OFF. In this embodiment, because the mechanical assembly 100 is also OFF, its moving parts are not generating frictional heat, nor are they operating without lubrication.

Referring now to FIG. 5B, the mechanical assembly 100 and lubrication system 200 are shown in an ON state. The pumping system 400 operates to withdraw lubricating media 120 from the collection area 300 through withdrawal location 450 into suction conduit 425, and then transports the lubricating media 120 through discharge conduit 420 to distribution location 440. The lubricating media 120 is thereby distributed via distribution mechanism 460 to a mechanical assembly 100 located within collection area 300. The lubricating media 120 then drips down from mechanical assembly 100 and collects proximate to bottom 310 of housing 305. Because the pumping system 400 continuously withdraws a substantial portion of the lubricating media 120 from the bottom 310 of the housing 305 of collection area 300, the lubricating media 120 maintains a dynamic operating level 370 that is lower than the static operating level 380. Under this combination of conditions, the mechanical assembly 100 is adequately lubricated and cooled, resulting in no damage.

Figure 6A:
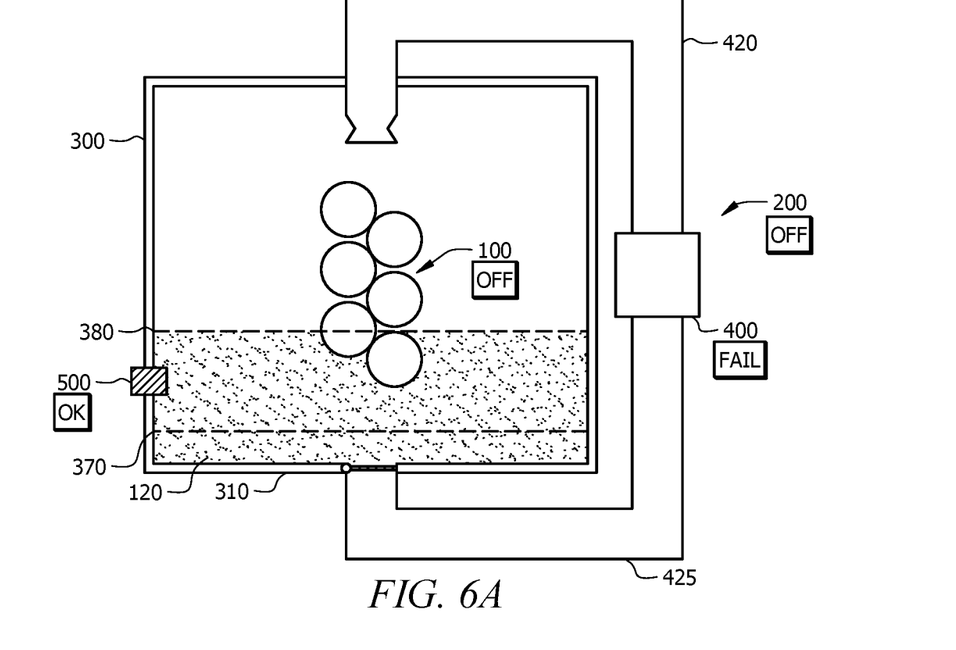
FIG. 6A depicts a side cutaway view of a lubrication system in the OFF state in which the pumping system has FAILED according to an embodiment of the present disclosure.
Figure 6B:
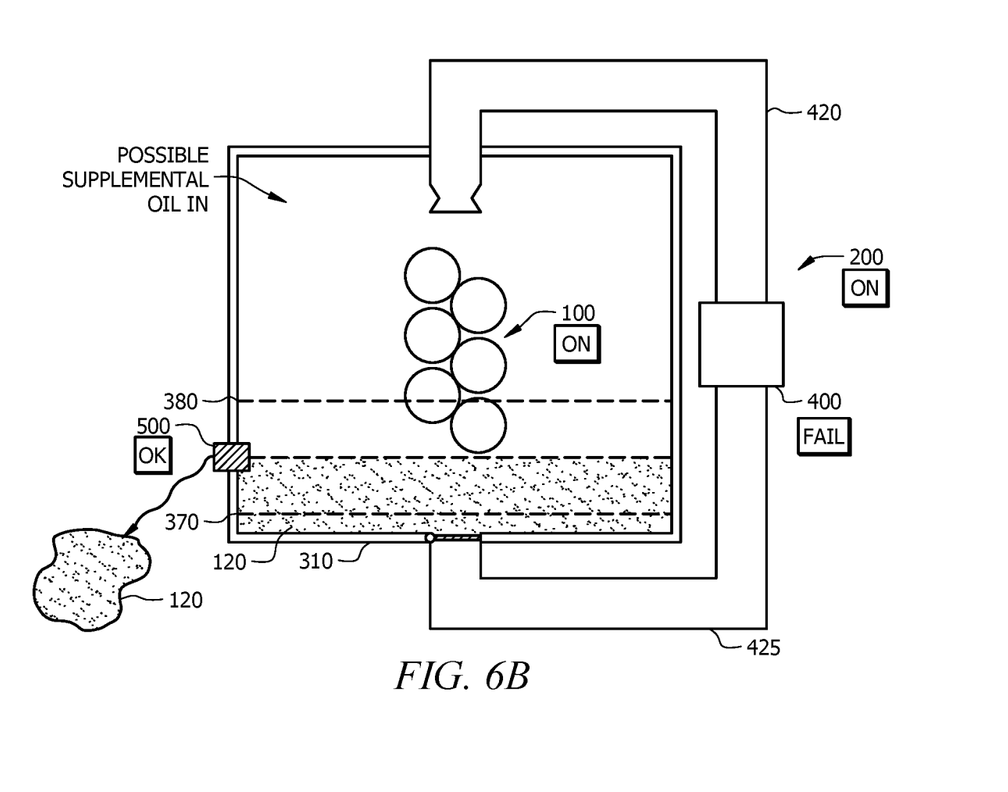
FIG. 6B depicts a side cutaway view of a lubrication system in the ON state in which the pumping system has FAILED according to an embodiment of the present disclosure.

FIGS. 6A and 6B illustrate conditions in which the pumping system 400 has FAILED and the drain valve 500 is OK. Referring to FIG. 6A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. In this OFF state, the lubricating media 120 accumulates to a static level 380 within the collection area 300. In an embodiment, the static level 380 may be higher than the lowest portions of a mechanical assembly 100 disposed within the lubrication system 200, resulting in said lower portions possibly being submerged in the OFF state. Yet, because the mechanical assembly 100 is OFF, its moving parts are not generating frictional heat, nor are they operating whilst submerged in high-temperature lubricating media 120.

Referring now to FIG. 6B, the mechanical assembly 100 and lubrication system 200 are shown in an ON state. The pumping system 400 has FAILED and is unable to pump lubricating media 120 from the collection area 300, thus hot lubricating media 120 accumulates and rises toward the mechanical assembly 100. If the hot lubricating media 120 rises such that portions of the mechanical assembly 100 are submerged, then continued operation of the mechanical assembly 100 could excessively churn and thereby further heat the lubricating media 120, as well as the mechanical assembly 100 components to potentially destructive levels. However, the heat from the lubricating media 120 causes the passive drain valve 500 to actuate open, thus preventing the accumulating lubricating media 120 from reaching the mechanical assembly 100. Under this combination of conditions, the mechanical assembly 100 will not be submerged in hazardous lubricating media 120. In some cases, a supplemental media, such as lubricating media 120 or a cooling media, may be provided to avoid damage to the mechanical assembly in the ON state.

Figure 7A:
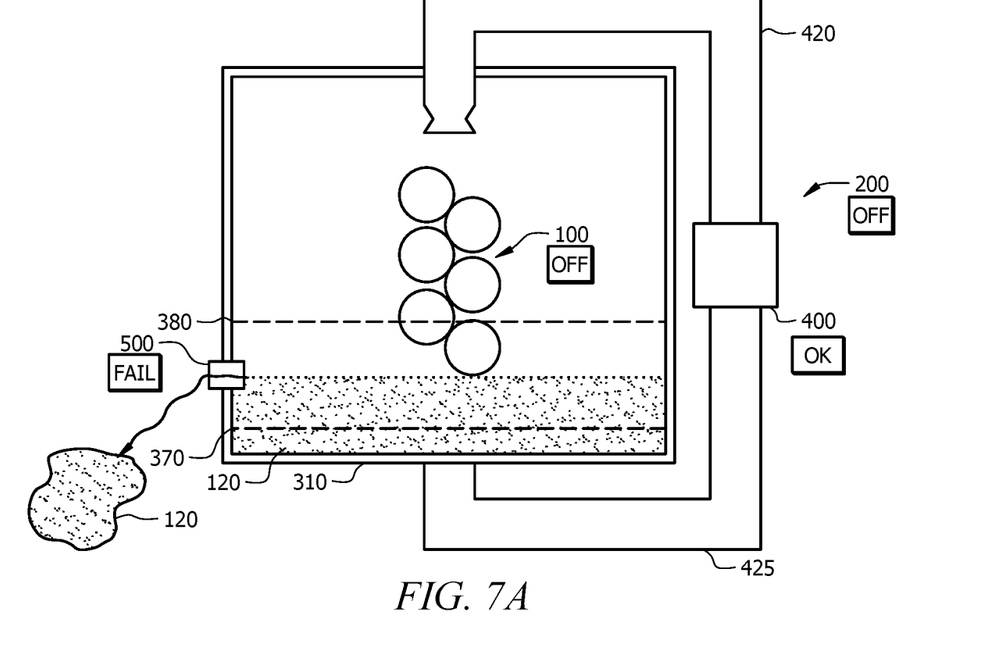
FIG. 7A depicts a side cutaway view of a lubrication system in the OFF state in which the drain valve has FAILED according to an embodiment of the present disclosure.
Figure 7B:
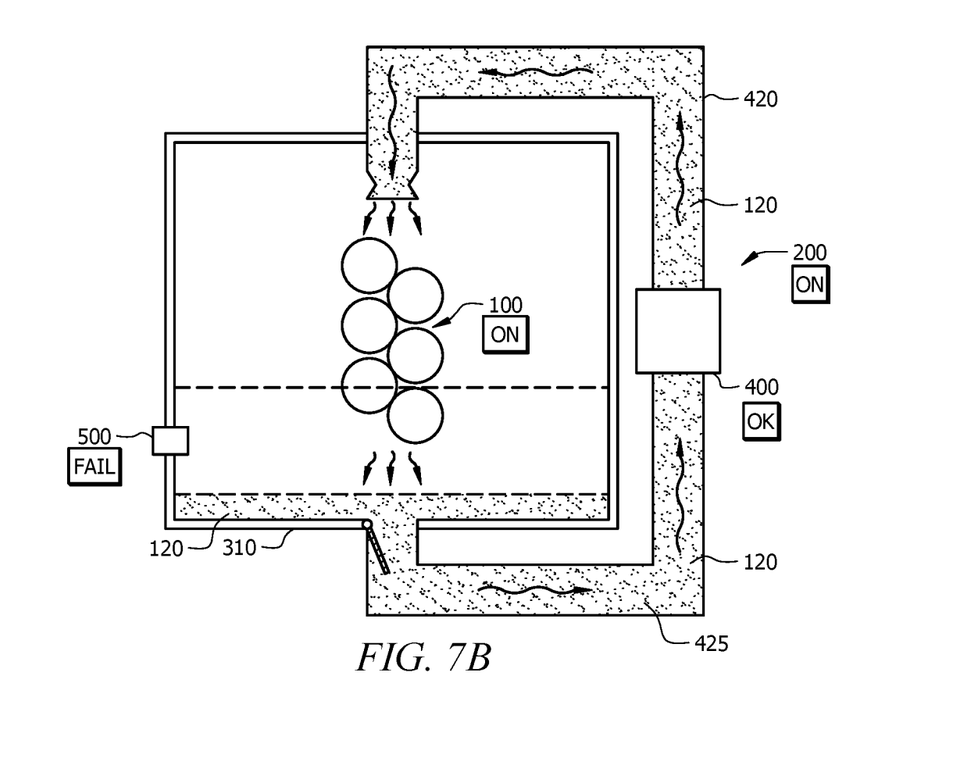
FIG. 7B depicts a side cutaway view of a lubrication system in the ON state in which the drain valve has FAILED according to an embodiment of the present disclosure.

FIGS. 7A and 7B illustrate conditions in which the drain valve 500 has FAILED. In an embodiment, the drain valve 500 is constructed to fail in the open position. Referring to FIG. 7A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. Unlike the conditions of FIG. 5A and FIG. 6A, the lubricating media 120 only accumulates to a level coinciding with the location of the failed drain valve 500, as the open valve 500 permits some of the lubricating media 120 to drain outside of the collection area 300. In an embodiment, the presence of drained lubricating media 120 (perhaps pooled on the ground or other surface proximate to or under the lubrication system 200) may provide an indirect visual indicator to an operator, maintainer, or other person that the drain valve 500 has failed and requires replacement prior to turning the lubrication system 200 and mechanical assembly 100 ON. In an embodiment, visual indication of a low oil level on an oil level-monitoring device may provide notification that the drain valve 500 has failed and requires replacement prior to turning the lubrication system 200 and mechanical assembly 100 ON.

Referring now to FIG. 7B, the mechanical assembly 100 and lubrication system 200 are shown in an ON state. The pumping system 400 operates to withdraw lubricating media 120 from the collection area 300 through withdrawal location 450 into suction conduit 425, and then transports the lubricating media 120 through discharge conduit 420 to distribution location 440. The lubricating media 120 is thereby distributed via distribution mechanism 460 to a mechanical assembly 100 located within collection area 300. The lubricating media 120 then drips down from mechanical assembly 100 and collects proximate to bottom 310 of housing 305. Because the pumping system 400 continuously withdraws a substantial portion of the lubricating media 120 from the bottom 310 of the housing 305 of collection area 300, the lubricating media 120 only rises to a dynamic operating level 370 that is lower than the failed valve 500. Under this combination of conditions, an unsubstantial amount of lubricating media 120 may escape, and the mechanical assembly 100 is adequately lubricated and cooled, resulting in no damage.

Figure 8A:
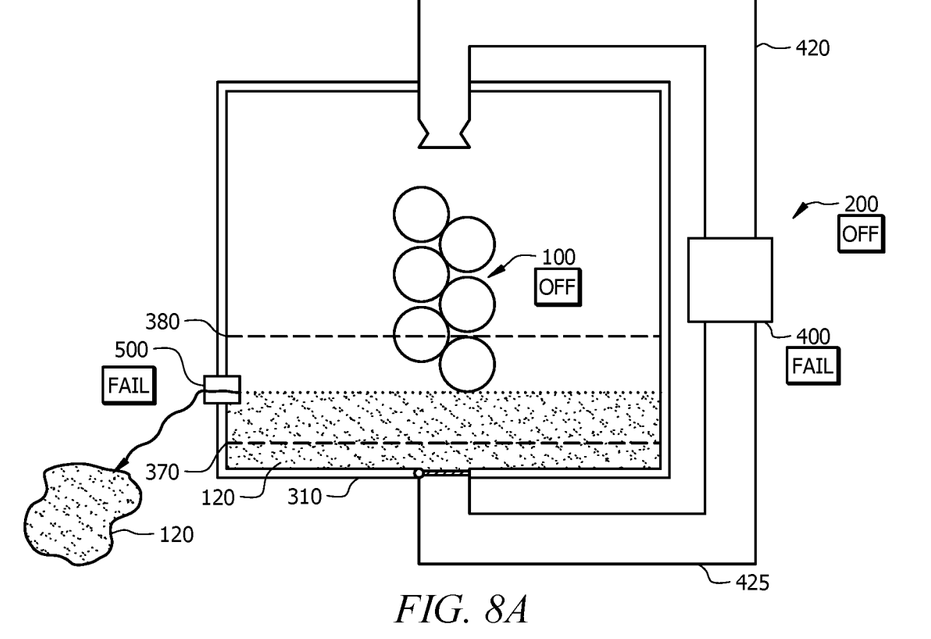
FIG. 8A depicts a side cutaway view of a lubrication system in the OFF state in which both the pumping system and the drain valve have FAILED according to an embodiment of the present disclosure.
Figure 8B:
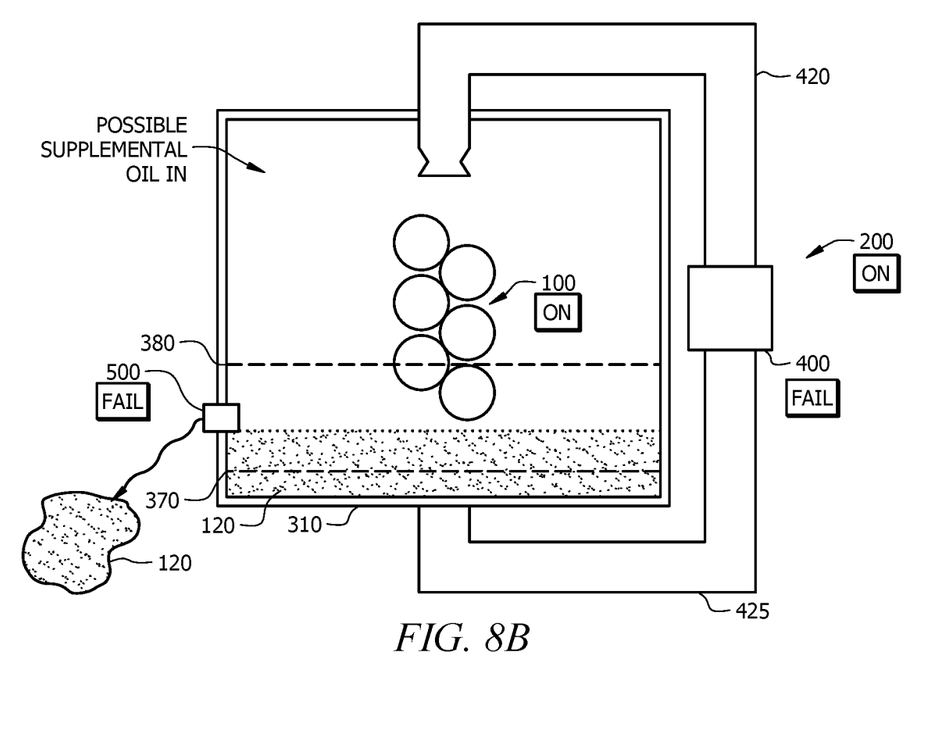
FIG. 8B depicts a side cutaway view of a lubrication system in the ON state in which both the pumping system and the drain valve have FAILED according to an embodiment of the present disclosure.

FIGS. 8A and 8B illustrate conditions in which both the pumping system 400 and the drain valve 500 have FAILED. Referring to FIG. 8A, the mechanical assembly 100 and lubrication system 200 are shown in an OFF state. Because the lubrication system 200 is OFF, a substantial majority of the lubricating media 120 collects proximate to the bottom 310 of housing 305 of collection area 300 due to gravity, as illustrated by the shaded region representing the lubricating media 120. Unlike the conditions of FIG. 5A and FIG. 6A, the lubricating media 120 only accumulates to a level coinciding with the location of the failed drain valve 500, as it permits some of the lubricating media 120 to drain outside of the collection area 300. In an embodiment, the presence of drained lubricating media 120 (perhaps pooled on the ground or other surface proximate to or under the lubrication system 200) may provide an indirect visual indicator to an operator, maintainer, or other person that the drain valve 500 has failed and requires replacement prior to turning the lubrication system 200 and mechanical assembly 100 ON.

Referring now to FIG. 8B, the mechanical assembly 100 and lubrication system 200 are shown in an ON state. The pumping system 400 has FAILED and is unable to pump lubricating media 120 from the collection area 300, thus hot lubricating media 120 accumulates and rises toward the mechanical assembly 100. However, the hot lubricating media 120 is prevented from reaching the mechanical assembly 100 as the failed drain valve 500 permits some of the lubricating media 120 to drain outside of the collection area 300. Under this combination of conditions, the mechanical assembly 100 will not be submerged in hazardous lubricating media 120. In some cases, a supplemental media, such as lubricating media 120 or a cooling media, may be provided to avoid damage to the mechanical assembly 100 in the ON state.

Figure 9:
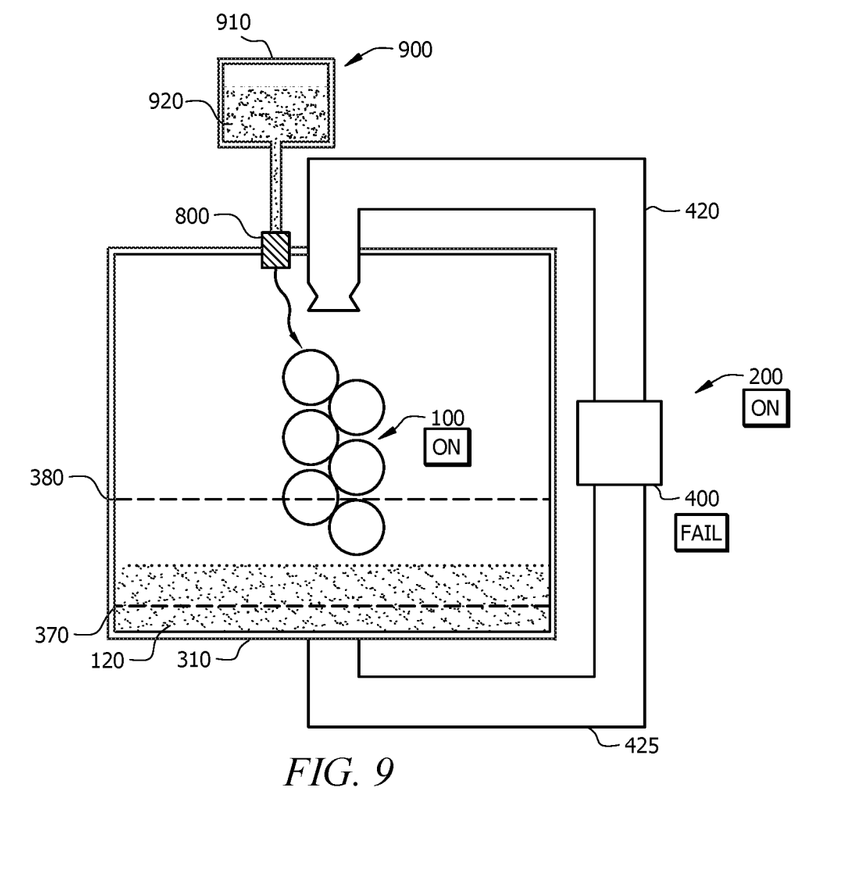
FIG. 9 depicts a side cutaway view of a lubrication system with a cooling system according to an embodiment of the present disclosure.

As mentioned in regards to the example embodiments disclosed in FIGS. 6B and 8B, it can be beneficial to provide a supplemental media 920, such as lubricating media 120 or a cooling media, as shown in FIG. 9. An example of a cooling media could be a gas that includes a majority of helium gas, as disclosed in U.S. Pat. No. 8,951,157, which is hereby incorporated by reference. In another example, supplemental media 920 could be a foam or a liquid that is configured to cool and/or lubricate components of mechanical assembly 100.

Accordingly, lubrication system 200 may also include a cooling system 900. Cooling system 900 can include a storage unit 910 that is configured to contain supplemental media 920. Cooling system 900 can also include a supplemental media valve 800 that can be configured to deliver supplemental media 920 from storage unit 910 to one or more components of mechanical assembly 100.

Figure 10A:
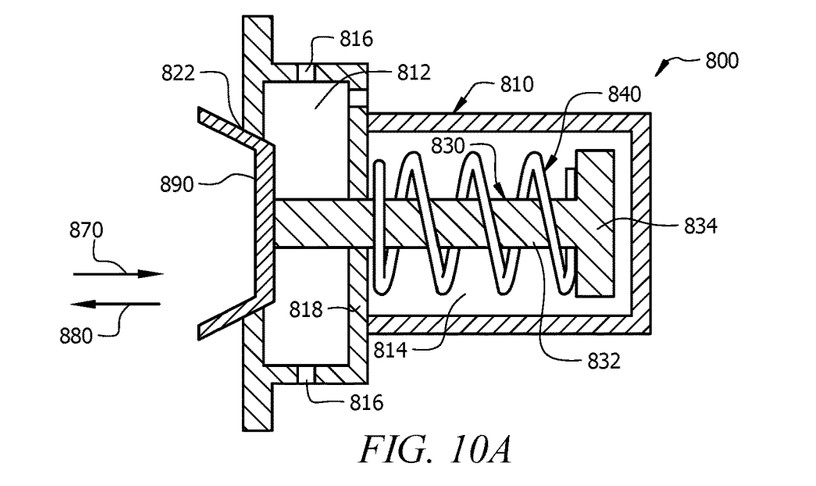
FIGS. 10A to 10C depict side cutaway views of representative valves, respectively, for use in a lubrication system according to various embodiments of the present disclosure.
Figure 10B:
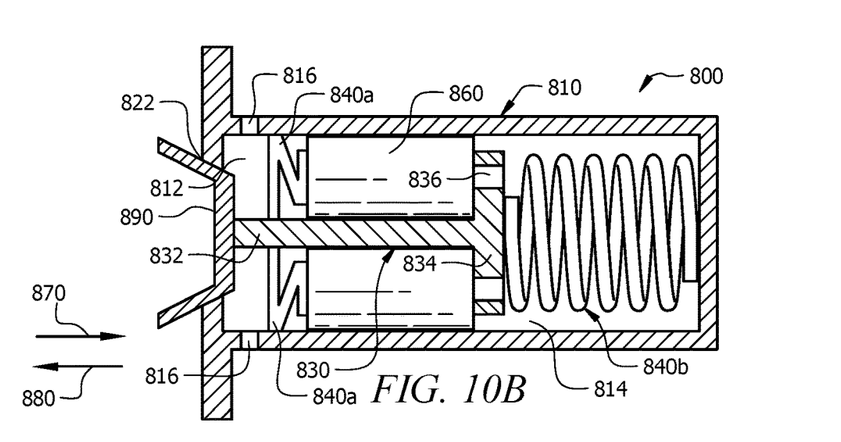
Figure 10C:
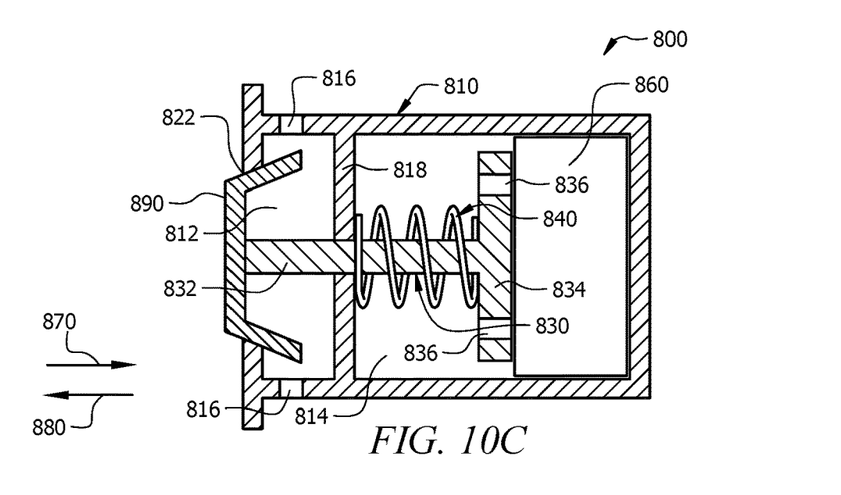

Now referring also to FIGS. 10A through 10C, valve 800 can include a casing 810 which can include features such as outer chamber 812, inner chamber 814, port 816, and wall 818. Valve 800 can also include a valve seat opening 822, a piston 830, a biasing member 840, and a plug 890. Biasing member 840 can represent a resilient device that can be pressed but substantially returns to its former shape when released, for example, a spring or a Belleville washer. Piston 830 can include features such as piston shaft 832, plunger 834, and opening 836. Valve 800 can also include a material 860 which changes phase as temperature changes. For example, as temperature increases, material 860 changes from a solid to a liquid.

Referring also to FIG. 10A, valve 800, according to one example embodiment, is shown in the closed position. In the closed position, the force 870 of biasing member 840, acts against a wall 818 of casing 810, which separates outer chamber 812 from inner chamber 814, and plunger 834 of piston 830. The force 870 of biasing member 840 against piston 830 biases the piston 830 to the end of inner chamber 814 and retracts the valve plug 890 to seal against a valve seat opening 822 in the casing 810 that leads to outer chamber 812. In an embodiment, biasing member 840 is a spring that comprises a material that changes properties with temperature. In an embodiment, biasing member 840 is a spring that comprises two different metals that expand at a different rate as they are heated. The different expansions of the metal would alter the spring rate of biasing member 840.

Valve 800 may be connected to storage unit 910 such that, supplemental media 920 from storage unit 910 may flow through ports 816 and into outer chamber 812 of casing 810. Valve 800 can be strategically placed within lubrication system 200 such that as the temperature of the components of mechanical assembly 100 increases, the temperature of components of valve 800 also increases. As the temperature of the valve 800 increases, as may happen in the event of a loss of lubrication within lubrication system 200, the temperature of biasing member 840 may also increase.

As the temperature of biasing member 840 increases, the material comprising biasing member 840 will respond by changing volume, thereby decreasing the spring rate of biasing member 840. As the spring rate is decreased, the force 880 of supplemental material 920 acting on valve plug 890 may overcome the bias force 870 of biasing member 840, which in turn may cause the valve plug 890 and piston 830 to move in the direction of force 880, as shown in FIG. 10A. When valve plug 890 moves in the direction of force 880, it will unseal from the valve seat opening 822 and allow a portion of the supplemental media 920 in outer chamber 812 to be delivered to mechanical assembly 100. Thus, in this manner, valve 800 is designed to actuate open in the event of a loss of lubrication event of lubrication system 200, which can be caused by the failure of pump system 400 or loss of lubricant in the system Referring also to FIG. 10B, valve 800, according to another example embodiment, is shown in the closed position. In the closed position, a biasing member 840a, such as a Belleville washer, exerts a first force 870 against material 860 and, in turn, plunger 834 of piston 830. Biasing member 840b, such as a spring, exerts a second force 880 against plunger 834 of piston 830, force 880 being in the opposite direction of force 870. In the closed position, the magnitude for first force 870 is greater than the second force 880, thereby biasing the piston 830 to a position within inner chamber 814 where the valve plug 890 is retracted to seal against the valve seat opening 822 in the casing 810 that leads to outer chamber 812.

In one example embodiment, material 860 changes phase with temperature, such as from a solid to a liquid at a predetermined threshold temperature. In an embodiment, material 860 comprises a eutectic material. In an embodiment, material 860 comprises lead, tin, polymer, wax, or another material that is affected by temperature change. In an embodiment, the composition of material 860 can be chosen such that material 860 begins to transition from a solid state to a liquid state at an approximate, predetermined temperature, such as approximately four hundred degrees Fahrenheit.

Referring also to FIG. 9, valve 800 may be connected to storage unit 910 such that, supplemental media 920 from storage unit 910 may flow through ports 816 and into outer chamber 812 of casing 810. Valve 800 can be strategically placed within lubrication system 200 such that as the temperature of the components of mechanical assembly 100 increases, the temperature of components of valve 800 also increases. As the temperature of the valve 800 increases, as may happen in the event of a loss of lubrication within lubrication system 200, the temperature of material 860 may also increase. As the temperature of material 860 increases, material 860 will respond by changing from a solid to a liquid. As material 860 is transformed into a liquid, the liquid material 860 will flow through opening 836 in the plunger 834 and there will be nothing solid for biasing member 840a to act against, thereby reducing first force 870 on plunger 834. As such, the bias force 880 of biasing member 840b acting against plunger 834 of piston 830 may cause the valve plug 890 and piston 830 to move in the direction of force 880 as shown in FIG. 10B.

When the valve plug 890 moves in the direction of force 880, it will unseal from the valve seat opening 822 and allow a portion of the supplemental media 920 in outer chamber 812 to be delivered to mechanical assembly 100. Thus, in this manner, valve 800 is designed to actuate open in the event of a loss of lubrication event of lubrication system 200, which can be caused by the failure of pump system 400.

Referring also to FIG. 10C, valve 800, according to yet another example embodiment, is shown in the closed position. In the closed position, biasing member 840 exerts a force 870 against plunger 834 of piston 830, and valve plug 890 is extended to seal against valve seat opening 822 in the casing 810 that leads to outer chamber 812. Plunger 834 of piston 830 engages a section of material 860 that is positioned between the plunger 834 and the end of inner chamber 814, which causes a second force 880 to act on plunger 834 of piston 830 that is in the opposite direction of force 870. In an embodiment, material 860 changes properties with temperature. In an embodiment, material 860 changes phase, such as from solid to liquid, at a predetermined threshold temperature. In an embodiment, material 860 comprises a eutectic material. In an embodiment, material 860 comprises lead or tin. In an embodiment, the composition of material 860 can be chosen such that material 860 begins to go from a solid state to a liquid state at an approximate, predetermined temperature, such as approximately four hundred degrees Fahrenheit.

Referring also to FIG. 9, valve 800 may be connected to storage unit 910 such that, supplemental media 920 from storage unit 910 may flow through ports 816 and into outer chamber 812 of casing 810. Valve 800 can be strategically placed within lubrication system 200 such that as the temperature of the components of mechanical assembly 100 increases, the temperature of components of valve 800 also increases. As the temperature of the valve 800 increases, as may happen in the event of a loss of lubrication within lubrication system 200, the temperature of material 860 may also increase. As the temperature of material 860 increases, material 860 will respond by changing from a solid to a liquid. As material 860 is transformed into a liquid, the liquid material 860 will flow through opening 836 in the plunger 834, thereby reducing force 880 acting on plunger 834. As such, the force 870 of biasing member 840 acting against plunger 834 of piston 830 may overcome force 880 and cause the valve plug 890 and piston 830 to move in the direction of force 870, as shown in FIG. 10C.

When the valve plug 890 moves in the direction of force 870, it will unseal from the valve seat opening 822 and allow a portion of the supplemental media 920 in outer chamber 812 to be delivered to mechanical assembly 100. Thus, in this manner, valve 800 is designed to actuate open in the event of a loss of lubrication event of lubrication system 200, which can be caused by the failure of pump system 400.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A system, comprising:
  a mechanical assembly;
  a pumping mechanism configured to deliver a lubricating media to a mechanical assembly; and
  a cooling system comprising:
    a storage unit configured to contain a supplemental media; and
    a valve operable to deliver the supplemental media from the storage unit to the mechanical assembly when a first force is greater than a second force, wherein the first force is substantially caused by the pressure of the supplemental media, the valve comprising:
      a biasing member that changes volume as temperature changes and exerts a substantial portion of the second force, wherein the second force decreases as the temperature of the biasing member increases.

2. The system according to claim 1, wherein the biasing member is a spring.

3. The system according to claim 1, wherein the supplemental media is a lubricant.

4. The system according to claim 1, wherein the mechanical assembly comprises a plurality of gears.

5. The system according to claim 1, wherein the valve comprises an inner chamber and an outer chamber.

6. The system according to claim 5, wherein the inner chamber comprises the biasing member, the outer chamber comprises a port that allows the supplemental media to flow from the storage unit to the mechanical assembly when the valve is open.

7. A valve comprising:
  a piston configured to open the valve when a first force is greater than a second force;
  supplemental media, wherein the pressure of the supplemental media exerts a substantial portion of the first force;
  a biasing member that changes volume as temperature changes and exerts a substantial portion of the second force, wherein the second force decreases as the temperature of the biasing member increases.

8. The valve according to claim 7, wherein the biasing member is a spring.

9. The valve according to claim 7, wherein the supplemental media is a lubricant.

10. The valve according to claim 7, wherein the valve comprises an inner chamber and an outer chamber.

11. The valve according to claim 10, wherein the inner chamber comprises the biasing member, the outer chamber comprises a port that allows the supplemental media to flow from a storage unit to a mechanical assembly when the valve is open.

\* \* \* \* \*